US012670344B2

(12) United States Patent
Shigeta

(10) Patent No.: US 12,670,344 B2
(45) Date of Patent: Jun. 30, 2026

(54) CAGE SYSTEM AND CHIP MANAGEMENT SYSTEM

(71) Applicant: ANGEL GROUP CO., LTD., Shiga (JP)

(72) Inventor: Yasushi Shigeta, Shiga (JP)

(73) Assignee: ANGEL GROUP CO., LTD., Shiga (JP)

( * ) Notice: Subject to any disclaimer, the term of this patent is extended or adjusted under 35 U.S.C. 154(b) by 0 days.

(21) Appl. No.: 19/063,904

(22) Filed: Feb. 26, 2025

(65) Prior Publication Data

US 2025/0200307 A1 Jun. 19, 2025

Related U.S. Application Data

(63) Continuation of application No. 18/370,097, filed on Sep. 19, 2023, which is a continuation of application No. 18/009,854, filed as application No. PCT/JP2021/021785 on Jun. 8, 2021, now Pat. No. 12,086,675.

(30) Foreign Application Priority Data

Jun. 12, 2020 (JP) ................................. 2020-102729

(51) Int. Cl.
*G06K 7/10* (2006.01)
*G07F 17/32* (2006.01)
(52) U.S. Cl.
CPC ....... *G06K 7/10366* (2013.01); *G07F 17/322* (2013.01); *G07F 17/3241* (2013.01); *G07F 17/3248* (2013.01)

(58) Field of Classification Search
None
See application file for complete search history.

(56) References Cited

U.S. PATENT DOCUMENTS 5,735,742 A 4/1998 French
2007/0060311 A1 3/2007 Rowe et al.
(Continued)

FOREIGN PATENT DOCUMENTS

CN 104620288 A 5/2015
JP 2005202502 A 7/2005
(Continued)

OTHER PUBLICATIONS

Korean Office Action dated Jun. 12, 2025 issued in KR Patent Application No. 10-2023-7031327.
(Continued)

*Primary Examiner* — Kristy A Haupt
(74) *Attorney, Agent, or Firm* — NORTON ROSE FULBRIGHT US LLP

(57) ABSTRACT

A cage is divided into a plurality of locations, including a cashier room. The gaming chip has an RFID tag storing a chip ID. The cage system that manages the movement of the gaming chips within the cage of the casino hall comprises: a chip reader that reads a chip ID from an RFID tag of a gaming chip moving between multiple locations within the cage; a chip reader that reads the chip ID from the RFID tag of the gaming chips that exit the cage to the casino hall; and a chip management database that records the chip IDs read by the chip reader as the movement history of the gaming chips.

5 Claims, 7 Drawing Sheets

(56)                References Cited

U.S. PATENT DOCUMENTS

| | | | |
|---|---|---|---|
| 2007/0060313 A1 | 3/2007 | Mathis et al. | |
| 2007/0066399 A1 | 3/2007 | Iwakiri | |
| 2010/0093428 A1 | 4/2010 | Mattice et al. | |
| 2010/0240446 A1 | 9/2010 | Koyama et al. | |
| 2013/0316797 A1* | 11/2013 | Gelinotte | G07F 17/3244 |
| | | | 463/25 |
| 2014/0266704 A1 | 9/2014 | Dalley, Jr. et al. | |
| 2016/0284160 A1 | 9/2016 | Oh | |
| 2018/0061178 A1 | 3/2018 | Shigeta | |
| 2018/0075690 A1 | 3/2018 | Moore et al. | |
| 2018/0185741 A1 | 7/2018 | Shigeta | |
| 2019/0005767 A1 | 1/2019 | Shigeta | |
| 2019/0043309 A1 | 2/2019 | Shigeta | |
| 2019/0168110 A1 | 6/2019 | Moore et al. | |
| 2020/0122018 A1 | 4/2020 | Shigeta | |
| 2021/0125451 A1 | 4/2021 | Shigeta | |

FOREIGN PATENT DOCUMENTS

| | | | |
|---|---|---|---|
| JP | 2006158843 A | 6/2006 | |
| JP | 2010213940 A | 9/2010 | |
| JP | 2015525391 A | 9/2015 | |
| JP | 2019005565 A | 1/2019 | |
| JP | 2021064285 A | 4/2021 | |
| KR | 20070087962 A | 8/2007 | |
| KR | 1020130130414 A1 | 12/2013 | |
| KR | 1020170132321 A | 12/2017 | |
| WO | 1997005935 A1 | 2/1997 | |
| WO | 2003082420 A1 | 10/2003 | |
| WO | 2019173405 A1 | 9/2019 | |
| WO | 2019221063 A1 | 11/2019 | |

OTHER PUBLICATIONS

Singapore Written Opinion dated Sep. 13, 2025 issued in SG Patent Application No. 11202261134R.

International Search Report dated Aug. 31, 2021 issued in PCT Application PCT/JP2021/021785.

U.S. Office Action dated Nov. 1, 2023 issued in U.S. Appl. No. 18/009,854.

European Search Report dated Oct. 24, 2023 issued in EP Application 21821547.3.

U.S. Office Action dated Jan. 29, 2025 issued in U.S. Appl. No. 18/370,097.

The extended European Search Report dated Feb. 17, 2025 issued in EP Application No. 25152858.4.

Japanese Office Action dated Mar. 18, 2025 issued in JP Application No. 2025-001729.

Japanese Office Action dated Mar. 18, 2025 issued in JP Application No. 2025-002218.

Chinese Office Action dated Aug. 26, 2025 issued in CN Patent Application No. 202311387718.6.

The extended European Search Report dated Apr. 28, 2025 issued in EP Application No. 25156852.3.

Chinese Office Action dated Nov. 7, 2025, issued in CN Application No. 202510036478.8.

U.S. Office Action dated Oct. 17, 2025, issued in U.S. Appl. No. 19/048,653.

Korean Office Action dated May 14, 2026, issued in KR Application No. 10-2025-7002980.

Extended European Search Report dated May 15, 2026, issued in EP Application No. 26152328.6.

Extended European Search Report dated May 18, 2026, issued in EP Application No. 26157784.5.

Chinese Office Action dated Apr. 14, 2026, issued in CN Application No. 202510205304.X.

Korean Office Action dated May 14, 2026, issued in KR Application No. 10-2025-7001896.

* cited by examiner

| CHIP ID | IN/OUT | FROM | TO | TIME | |
|---------|--------|------|-----|------|---|
| 24825 | OUT | MAIN BANK | | | ～H61 |
| 24825 | IN | MAIN BANK | F/C BANK | | ～H62 |

601　602　603　604　605

| CHIP ID | IN/OUT | FROM | TO | TIME | |
|---------|--------|------|-----|------|---|
| 24825 | OUT | TABLE-4 | F/C BANK | | ～H71 |
| 24825 | IN | | F/C BANK | | ～H72 |

601　602　603　604　605

| CHIP ID | IN/OUT | LOCATION | TIME | |
|---------|--------|----------|------|---|
| 24825 | OUT | VAULT | | ～H81 |
| 24825 | IN | MAIN BANK | | ～H82 |

601　602　603　604

| CHIP ID | LOCATION | TIME | |
|---------|----------|------|---|
| 24825 | VAULT | | ～H91 |
| 24825 | MAIN BANK | | ～H92 |

601　603　604

| CHIP ID | IN/OUT | LOCATION | TIME | |
|---------|--------|----------|------|------|
| 24825 | OUT | CASHIER-2 | | ～H101 |
| 24825 | IN | PLAYER-5 | | ～H102 |
| 24825 | OUT | PLAYER-5 | | ～H103 |
| 24825 | IN | CASHIER-3 | | ～H104 |

CAGE SYSTEM AND CHIP MANAGEMENT SYSTEM

CROSS-REFERENCE TO RELATED APPLICATIONS

This application is a continuation of U.S. patent application Ser. No. 18/370,097 filed Sep. 19, 2023, which is a continuation of U.S. patent application Ser. No. 18/009,854 filed Dec. 12, 2022 (now U.S. Pat. No. 12,086,675), which is a national phase application under 35 U.S.C. § 371 of International Pat. App. PCT/JP2021/021785 filed Jun. 8, 2021, which claims priority to JP Pat. App. 2020-102729 filed Jun. 12, 2020. The contents of each application are incorporated herein by reference.

TECHNICAL FIELD

The present invention relates to a cage system for managing gaming chips in cages in casinos and a chip management system including the cage system.

BACKGROUND ART

As a system for managing gaming chips in casinos, a gaming chip tracing system is known that monitors which user has which gaming chip by embedding an RFID tag that stores at least a gaming chip ID in the gaming chip and associating the gaming chip ID with a user ID.

Also known is a gaming chip security system that stores valid gaming chip IDs in a database and determines the validity or authenticity of a gaming chip by reading the gaming chip ID from the RFID tag of the gaming chip in the casino (e.g., at a table) and checking it against the database (see, for example, Patent Publication No. JP2019-5565).

SUMMARY OF INVENTION

Gaming chips are brought into the casino through a cage inside the casino, and gaming chips to be disposed of are also taken out of the cage. Conventional gaming chip tracing systems do not necessarily monitor all movements of gaming chips within the casino, including the movement of gaming chips inside the cage and between the cage and each location in the casino.

Therefore, the present invention provides a cage system for monitoring the movement of gaming chips in the cage and between the cage and each location in the casino, and a gaming chip management system that includes the cage system and manages gaming chips in the casino.

A cage system of the present invention is a cage system for managing movement of gaming chips within a cage in a casino hall, wherein the cage being divided into a plurality of locations including a cashier, and the gaming chips have an RFID tag that stores an ID, the cage system comprises: a first reading device configured to read the chip ID from the RFID tag of the gaming chip moving between the plurality of locations; a second reading device configured to read the chip ID of the gaming chip leaving the cage into the casino hall; and a recording device configured to record the chip IDs read by the first and second reading device as the movement history of the gaming chips. This configuration enables the movement of gaming chips in the cage to be managed.

In the cage system described above, the recording device may record the destination and/or the source of the movement together with the chip ID in the movement history. This configuration allows the user to ascertain whether the movement is being performed accurately.

The cage system described above may be further provided with management device configured to determine whether the movement is appropriate based on the movement history. This configuration allows for the detection of inappropriate moves.

In the cage system described above, the management device may record, in the recording device, the fact that a gaming chip with a movement history that does not conform to the predetermined movement history possibilities is fraudulent or suspected of being fraudulent.

The cage system described above may further comprise a third reading device configured to read the chip ID from the RFID tag of the gaming chip entering the cage from the casino hall. This configuration allows for complete control of the gaming chips in the cage.

In the cage system described above, the management device may issue an alert or record a destination when the gaming chips are not received at the destination in the case where the destination is recorded in the movement history of the gaming chips leaving the casino hall. This configuration allows detection that the transfer from the cage to a predetermined location in the casino hall was not completed successfully.

In the cage system described above, the management device may issue an alert or record an alert when the gaming chips are not received at the destination within a predetermined time. With this configuration, it can be determined that there is an abnormality when the transfer is not completed within the predetermined time.

A chip management system in an aspect of the present invention comprises: a cage system of any of the above; and a fourth reading device installed at a game table and configured to read the chip ID from the RFID tag of the gaming chip. This configuration enables management of gaming chips in a casino hall including cages.

In the above chip management system, the management device may calculate the total amount of gaming chips possessed by players in the casino hall. This configuration allows for real-time total casino debt.

In the above chip management system, the management device may record date and time information in the movement history. This configuration allows the movement history to be recorded in more detail.

In the above chip management system, the management device may detect suspicious movement of the gaming chips based on the date and time information. This configuration allows various suspicious movements to be detected.

In the above chip management system, the management device may record information on the staff members involved in the movement in the movement history. This configuration makes it possible to identify the staff involved in an inappropriate move.

BRIEF DESCRIPTION OF DRAWINGS

FIG. 10 shows an example of data in the chip management database that is updated by the fourth method of managing the movement of gaming chips in accordance with the embodiment of the present invention.

DESCRIPTION OF EMBODIMENTS

The cage system and gaming chip management system of embodiment of the present invention will be described in detail below with reference to the drawings. However, this invention is not limited by the following embodiments, and the components in the following embodiments include those that can be easily assumed by those skilled in the art or are substantially the same.

Figure 1:
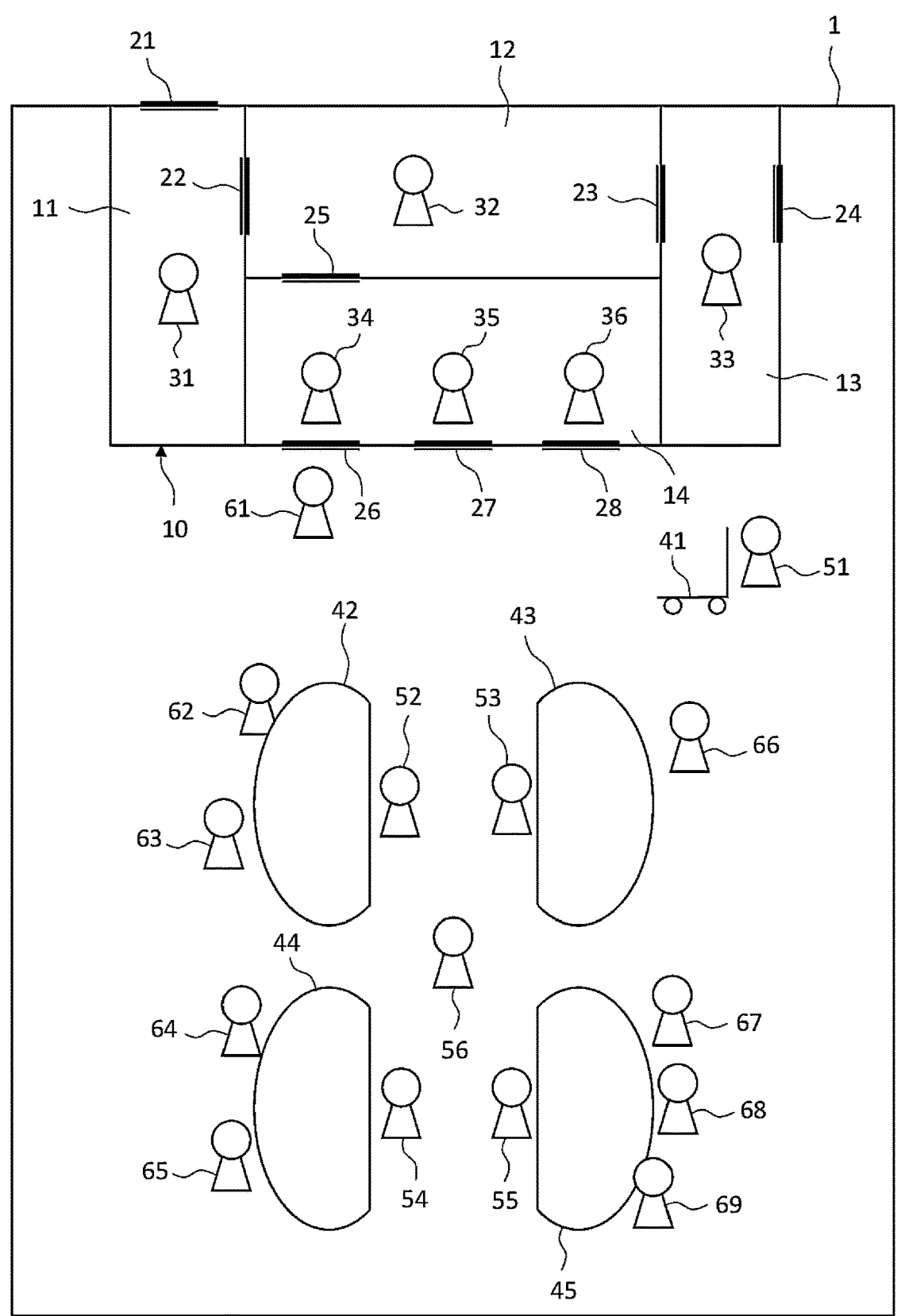
FIG. 1 shows a schematic diagram of the overall structure of a casino in accordance with the embodiment of the present invention.

FIG. 1 shows a schematic diagram of the overall structure of a casino in accordance with the embodiment of the present invention. The casino hall 1 is equipped with a cage 10 and a plurality of game tables 42-45. The floor on which the game tables 42-45 are provided may be divided into a floor for VIPs and a floor for the masses. The cage 10 may be used only by security staff. The cage 10 is a room that only security staff may enter. The cage 10 is divided into vault 11, main bank room 12, F/C bank room 13, and cashier room 14.

The vault 11 has a gate 21 that leads to the outside of cage 10. A gate 22 is provided between the vault 11 and the main bank room 12, a gate 23 is provided between the main bank room 12 and the F/C bank room 13, a gate 25 is provided between the main bank room 12 and the cashier room 14, and the F/C bank room 13 is provided with a gate 24 leading to the casino hall 1 with game tables 42-45. Cashier room 14 has gates (windows) 26-28 leading to casino hall 1. Each gate 21-25 may allow the traffic of people and gaming chips, or only gaming chips may pass through and a door for people to enter and exit may be provided separately from the gate. The windows 26-28 are open enough to allow exchange of gaming chips for cash.

Vault staff 31 is located in vault 11, main bank staff 32 is located in the main bank 12, F/C bank staff 33 is located in the F/C bank room 13, and cashier staff 34-36 are located in the cashier room 14, corresponding to the windows 26-28.

The casino hall 1 is equipped with game tables 42-45, with one dealer 52-55 at each of the game tables 42-45. Although only four game tables are shown in the example in FIG. 1, more game tables are actually placed in casino hall 1. In addition, a pit manager 56 is located for several adjacent game tables 42.

In the example in FIG. 1, there are players 61-69 inside casino hall 1. The players inside the casino hall 1, like player 61 shown in FIG. 1, can purchase gaming chips or redeem gaming chips through one of the windows 26-28. Players who have purchased gaming chips in cage 10 can enjoy the games by betting the gaming chips at game tables 42-45. If the player loses the game, the dealer collects the gaming chips, and if the player wins the game, the player receives a redemption from the dealer according to the rules of the game and the bet amount. In this way, the gaming chips in the player's possession increase or decrease depending on the game. When players run out of gaming chips, they can purchase (buy-in) gaming chips again at cage 10. Players can also redeem (buy out) their gaming chips at the cage when they finish playing.

At game tables 42-45, gaming chips are collected from players who lose games and gaming chips are paid to players who win games. This increases or decreases the amount of gaming chips held by the dealer (casino) at the game table. When gaming chips run low at the game tables, gaming chip carrying staff 51 receives the gaming chips from the gate 24 of the F/C bank room 13 and transports them to the game tables to replenish them. This replenishment of gaming chips at the table games is also referred to as "fill." When there is an excess of gaming chips at the game table, the gaming chip carrying staff 51 transports the gaming chips from the game table to the cage 10. The gaming chips are stored in the F/C bank room 13 through gate 24. This return of gaming chips from the game tables to the cage 10 is also referred to as "credit."

When maintaining a history of gaming chip movements in the game hall 1, the source, destination, and possible locations between them are hereinafter referred to as "locations." In the case of the example in FIG. 1, for example, each room in the cage 10 and each game table are each referred to as a location.

Figure 2:
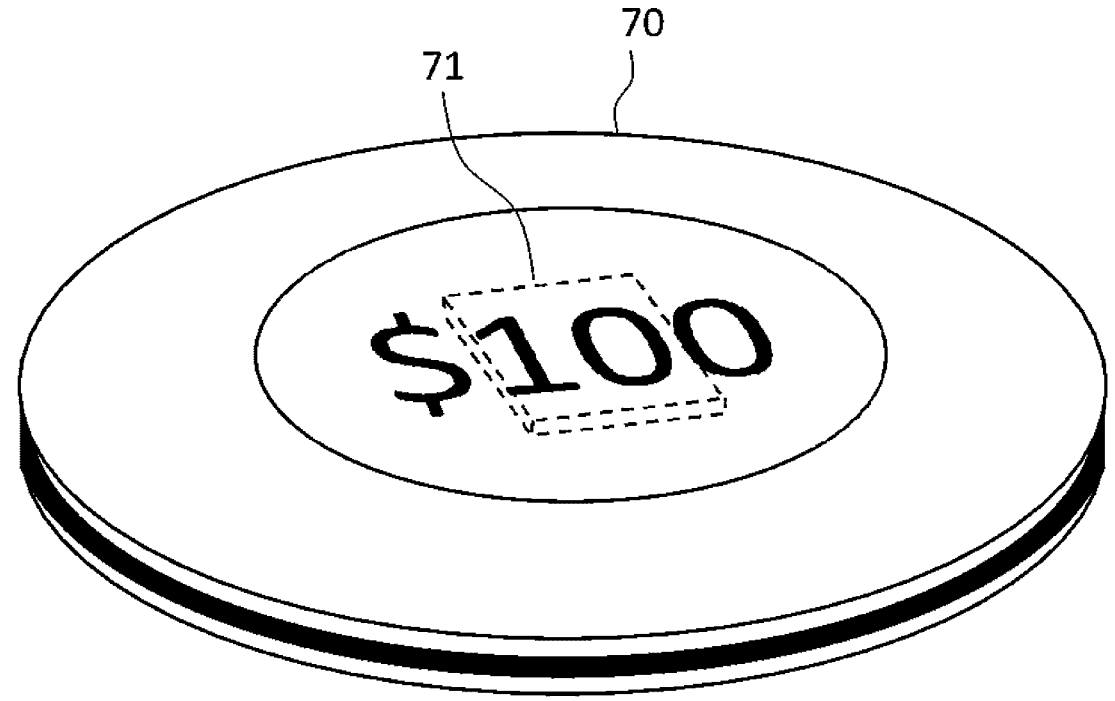
FIG. 2 shows a diagram of a gaming chip in accordance with the embodiment of the present invention.

FIG. 2 shows a diagram of a gaming chip in accordance with the embodiment of the present invention. FIG. 2 shows a $100 gaming chip. The gaming chip 70 has a disc shape, and the face value ("$100" in the case of FIG. 2) is shown on both sides. Multiple layers are laminated in the order of white layer, colored layer, and white layer in the direction of thickness, and it has a stripe pattern with the colored layer sandwiched by the white layer on the side. The color of the colored layer differs according to the face value, and thus the face value of the chip can be determined by distinguishing the color of the colored layer.

An RFID tag 71 is embedded in the gaming chip 70. The RFID tag 71 stores the chip ID of the chip and the face value information. The RFID tag 71 may be writable. The RFID tag 71 may record the current location or holder information of the gaming chip, and may also record the past location or holder history of the gaming chip. The gaming chip 70 may be constructed by crimping together a plurality of plates, or may be constructed by resin molding.

Figure 3:
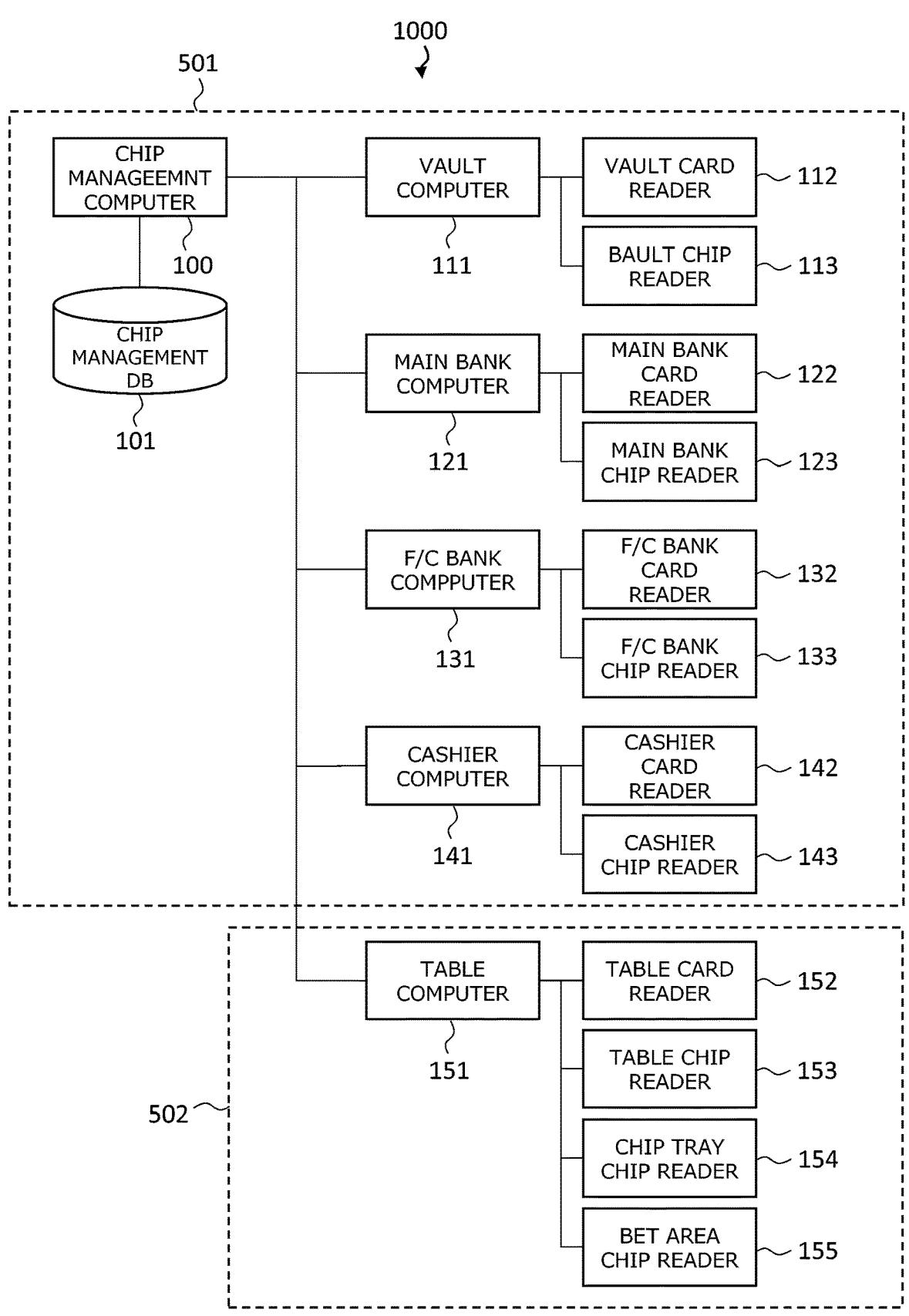
FIG. 3 shows a block diagram of the gaming chip management system in accordance with the embodiment of the present invention.

FIG. 3 shows a block diagram of the gaming chip management system in accordance with the embodiment of the present invention. The chip management system 1000 consists of a cage system 501 and a plurality of table systems 502. The table systems 502 are provided for each game table. The cage system 501 is equipped with a chip management database 101 and a chip management computer 100 for integrated management of chips in the cage 10 and in the casino hall 1.

The cage system 501 has a vault computer 111, which is installed in the vault 11, and a vault card reader 112 and a vault chip reader 113, which is connected to the vault computer 111. The cage system 501 has a main bank computer 121, which is installed in the main bank room 12, and a main bank card reader 122 and a main bank chip reader 123, which are connected to the main bank computer 121. The cage system 501 has an F/C bank computer 131, which is installed in the F/C bank room 13, and a bank computer 131 and a F/C bank card reader 133, which is connected the F/C bank computer 131. The cage system 501 has a cashier computer 141, which is installed for each of the windows 26-28, and a cashier card reader 142 and a cashier chip reader 143, which is connected to the cashier computer 141.

The table system 502 has a table computer 151, and a table card reader 152, a table chip reader 153, a chip tray chip reader 154 and a plurality of betting area chip readers 155, which are connected to the table computer 151. Although only one table system 502 is shown in FIG. 3, a plurality of table systems 502 are provided for a plurality of game tables.

The vault computer 111, the main bank computer 121, the F/C bank computer 131, the cashier computer 141, the table computer 151, and the chip management database 101 are each connected to chip management computer 100. The other computers and the chip management database 101 may be wired or wirelessly connected via a local network. Alternatively, the chip management computer 101 and chip management database 101 may be located on a wide area network (e.g., the Internet). Or, the chip management computer 101 and chip management data 101 may be located on a wide area network (e.g., the Internet) and connected to other computers via a wide area network. In other words, the chip management computer 100 and chip management database 101 may be located in the cloud rather than in a casino.

Each computer 100, 111, 121, 131, 141, and 151 are equipped with a input device, not shown in the figure, to receive operational inputs by the corresponding staff. The input devices are, for example, keyboards, mouses, buttons, touch pads, touch panels, and voice input devices. The functions of each computer may be consolidated in the chip management computer 100, leaving only these input devices and communication devices at the corresponding locations. In this case, various signals (e.g., input signals input to input devices, signals read by chip readers, etc.) may be transmitted directly between the input devices, card readers, and chip readers at each location and the management computer 100.

The card readers 112, 122, 132, 142, and 152 at each location may transmit a staff ID or player ID from an ID card held by a staff member or player. ID card and read the staff ID or player ID from the ID card. Specifically, the vault card reader 112, the main bank card reader 122, and the F/C bank card reader 132 reads the staff IDs from the ID cards of the corresponding staff members, and the cashier card reader 142 reads the staff IDs and also reads the player IDs of players who purchase gaming chips or redeem gaming chips at the cashier. The table card reader 152 also reads the staff ID of the corresponding dealer and reads the player ID of the player playing.

The chip readers 113, 123, 133, 143, 153, 155 at each location reads information from the RFID tag 71 of the gaming chip 70 and write information to the RFID tag 71. In particular, each of the chip readers 113, 123, 133, 143, and 153 read information from and write information to the RFID tag 71 of the gaming chip 70 when the gaming chip 70 is moved to the corresponding location from the other location and when the gaming chip moves from the location to the other location (i.e., when the gaming chip 70 leaves the location).

Figure 4:
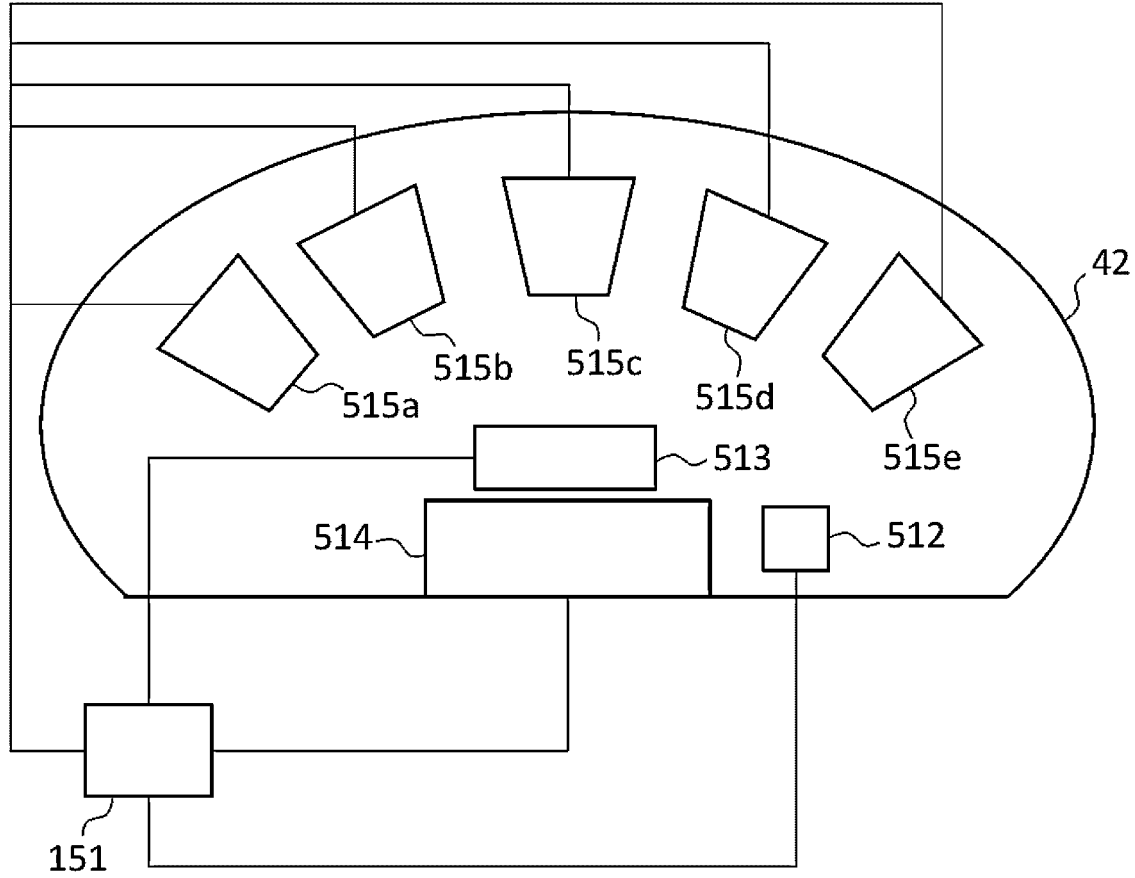
FIG. 4 shows a schematic diagram of a game table in accordance with the embodiment of the present invention.

FIG. 4 shows a schematic diagram of a game table in accordance with the embodiment of the present invention. In FIG. 4, the game table 42 is shown as an example. The game table 42 has a plurality of playing positions. The game table 42 has, on the table surface, a plurality of betting areas corresponding to the plurality of playing positions, a chip tray that accommodates the dealer's chips, a dealer area for reading and writing information to the RFID tag 71 of the gaming chip 70 placed therein, and an ID card area for reading the ID cards of the dealers and players.

The chip tray is provided with a tray antenna 514 for reading the RFID tag 71 of the gaming chips 70 housed therein. Each of the multiple betting areas is provided with an betting area antenna 515a-515e inside the table surface to read the RFID tags 71 of the gaming chips 70 placed therein. The dealer area is equipped with an dealer antenna 513 inside the table surface to read RFID tags 71 of the gaming chips 70 placed therein. The ID card area is equipped with an ID card antenna 512 inside the table surface.

Each antenna 512-515 is connected to a table computer 151 and transmit the readout signals to the table computer 151. The table computer 151 obtains various information stored in the RFID tags 71 and ID cards by decoding the signals from each antenna.

The staff members assigned to each location have their own card ID to be read by the corresponding card reader before starting work. The computer at each location transmits the read staff ID and its date and time to the chip management computer 100. The chip management computer 100 stores the staff ID read by the card reader at each location in the chip management database 101, along with the location and date and time information.

The chip management database 101 contains a player table, a chip table, a game table table, a staff table, and a movement history table. The player table contains the registration information of the players. The player table contains player IDs, various player attributes, and player statuses such as VIP, suspect, blacklist, etc. for each player. The chip table contains the chip ID, face value, type, and manufacturing information, as well as chip statuses such as valid, missing, stolen, and invalid. The game table contains the table ID, game type, and other information. The staff table contains staff IDs, various staff attributes, etc. The movement history table contains the location or history of the holder of the gaming chip 70.

Figure 5:
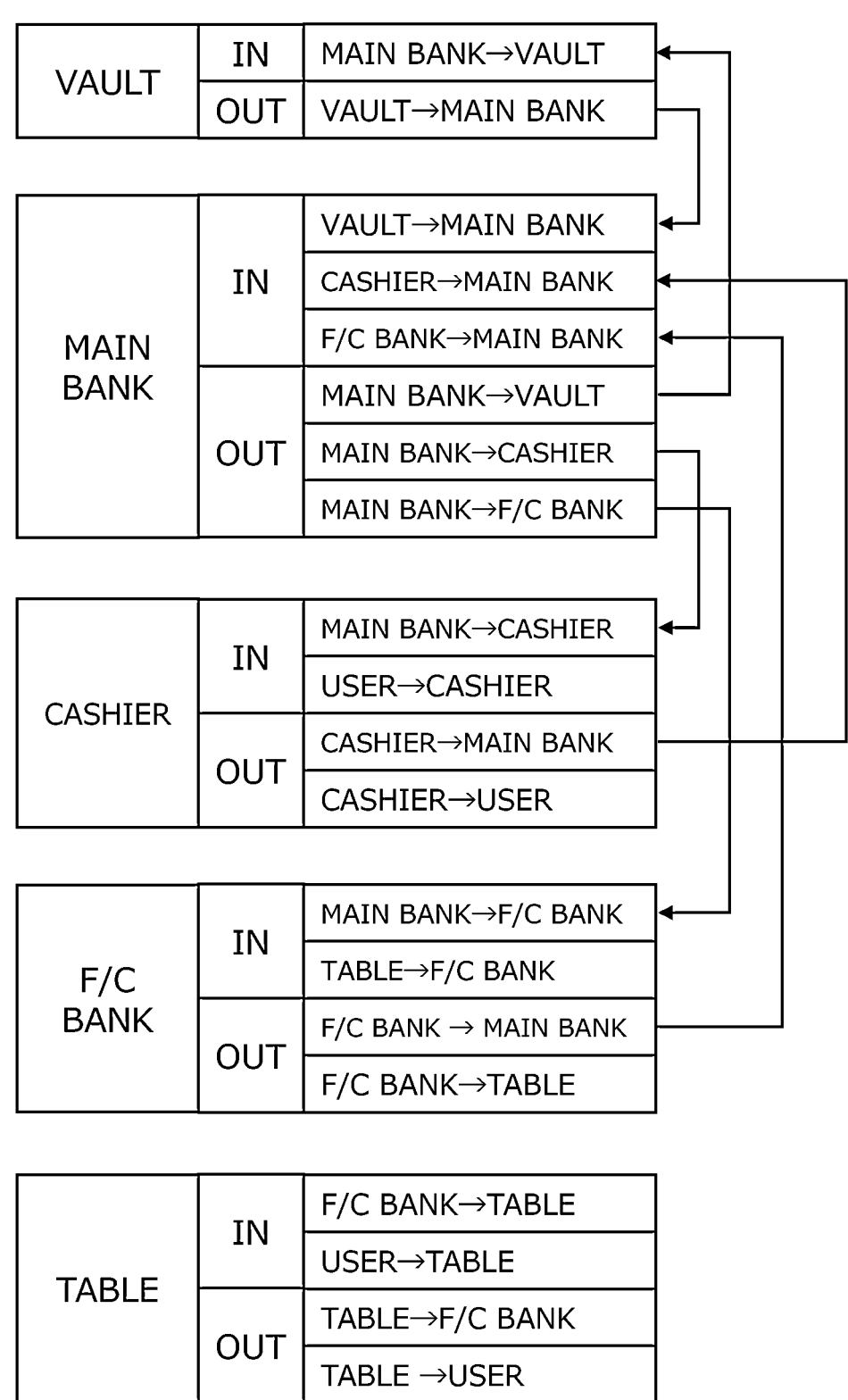
FIG. 5 shows the manner in which gaming chips are moved in accordance with the embodiment of the present invention.

(Movement Management of Gaming Chips) FIG. 5 shows the manner in which gaming chips are moved in accordance with the embodiment of the present invention. As shown in FIG. 5, each location, with the exception of the vault, has the potential for multiple transfers from multiple sources when gaming chips are coming in, and multiple transfers to multiple destinations when they are going out. The chip management system of this embodiment recognizes these transfers. To do so, several methods as follows can be employed.

In the first method, at each location, when a gaming chip 70 comes in, the computer at the location specifies the source of the movement and reports that designation along with the chip ID of the incoming gaming chip 70 to the chip management computer 100, and when a gaming chip 70 leaves from each location, the computer at that location reports the source of the movement and the chip ID of the incoming gaming chip 70 to the chip management computer 100. When the gaming chips leave each location, the information of the location, i.e., the source of the movement, and the chip ID of the gaming chips 70 are reported to the chip management computer 100.

For example, when a gaming chip 70 moves from the main bank room 12 to the F/C bank room 13, the main bank computer 121 reads the chip IDs of the gaming chips 70 using the main bank chip reader 123, and reports that the gaming chips 70 leaves the main bank room 12 with the read chip ID. The chip management computer 100 updates the chip management database 101 in response to this report.

Then, in the F/C bank room 13 after receiving the gaming chips 70 from the main bank room 12, the F/C bank staff 33 operates the input device of the F/C bank computer 131 to input the designation that the gaming chip 70 is came from the main bank room 12 (the transfer source), and reads the chip IDs of the gaming chip 70s by the F/C bank reader 133. The F/C bank computer 131 reports the read chip ID and the designation that the destination is the main bank room 12 (source) to the chip management computer 100. The chip management computer 100 updates the chip management database 101 in response to this report.

Figure 6:
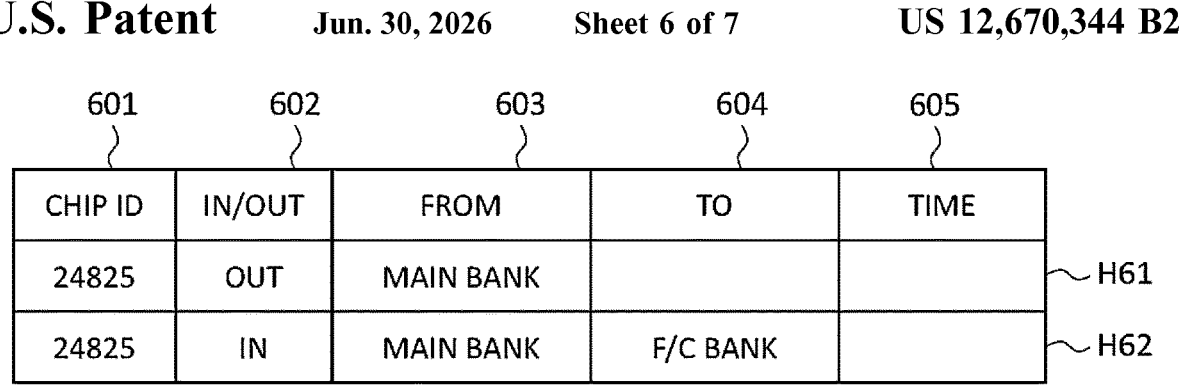
FIG. 6 shows an example of data in the chip management database that is updated by the first method of managing the movement of gaming chips in accordance with the embodiment of the present invention.

FIG. 6 shows an example of data in the chip management database that is updated by the first method of managing the movement of gaming chips in accordance with the embodiment of the present invention. In the example of FIG. 6, shows the movement history of the chip whose chip ID is "24825." The chip management database 101 stores the chip ID 601, entry/exit information 602, source information 603, destination information 604, and date and time information 605 as information on the movement history of the gaming chip 70.

According to the first method, as shown in FIG. 6, for a gaming chip 70 leaving a location, the information on its source is obtained (history H61), and for the gaming chips 70 coming into a location, information on its source and destination is obtained (history H62), so based on the history H61 and the history H62, it can be determined that the gaming chip 70 have actually left the main bank room 12 and have been received in the F/C bank room 13.

In the second method, when a gaming chip 70 leaves the computer at each location, the computer at that location designates the destination of the gaming chip 70 and report the designation along with the chip ID of the gaming chip 70 leaving the location to the chip management computer 100, and when gaming chip 70 come into each location, the location or destination information and the chip ID of the gaming chip 70 are reported to the chip management computer 100.

For example, when a gaming chip 70 is transferred (credited) from table-4 to the F/C bank room 13, the dealer reads the chip ID of the gaming chips 70 using the table chip reader 153 on the game table and designates the F/C bank room 13 as the destination (designating a credit) by operating the input device of the table computer 151. The table computer 151 reports this chip ID, the F/C bank room 13 as the destination, and the table ID of the table-4 as the source to the chip management computer 100. The chip management computer 100 updates the chip management database 101 according to this report.

In the F/C bank room 13 as a destination, upon receiving gaming chips 70, F/C bank staff 33 will use the F/C bank chip reader 133 to determine the chip ID of the gaming chip 70. F/C bank computer 131 reports the read chip ID and the fact that it is coming into the F/C bank room 13. The chip management computer 100 updates the chip management database 101 according to this report.

Figure 7:
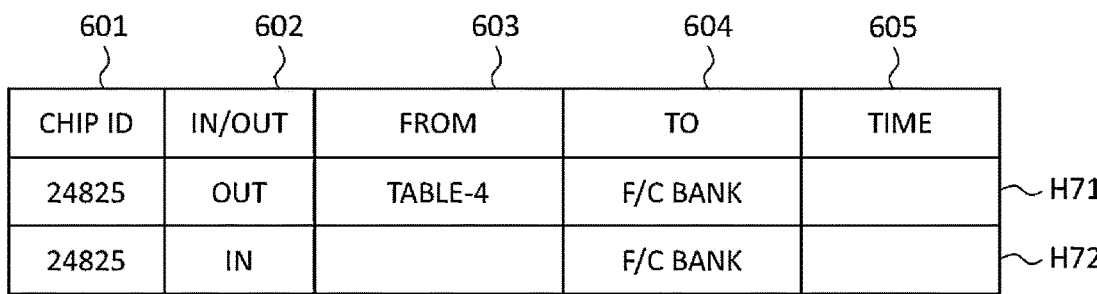
FIG. 7 shows an example of data in the chip management database that is updated by the second method of managing the movement of gaming chips in accordance with the embodiment of the present invention.

FIG. 7 shows an example of data in the chip management database that is updated by the second method of managing the movement of gaming chips in accordance with the embodiment of the present invention. The example in FIG.

7 also shows movement history of the gaming chip 70 with a chip ID of "24825." The chip management database 101 contains information on the movement history of the gaming chip 70, including the chip ID 601, entry/exit information 602, source information 603, destination information 604, and date and time 605.

According to the second method, as shown in FIG. 7, for a gaming chip 70 leaving a location, the source and destination information is obtained (history H71), and for a gaming chip 70 entering a location, information on their destination is obtained (history H72), so based on the history H71 and the history H72, it can be confirmed that the gaming chip 70 has indeed left the table-4 and have been received in the F/C bank room 13.

The third method is a combination of the first and second methods. That is, at the computer at each location, for incoming gaming chip 70, the source is designated, and for outgoing gaming chips 70, the destination is designated.

In the fourth method, staff at each location designate whether the gaming chips 70 are going out or coming in using the input device on each location's computer, and reports the designation along with the chip ID of the gaming chip 70 read by the chip reader to the chip management computer 100. The chip management computer 100 updates the entry/exit information and location information in the chip management database 101 based on this report.

Figure 8:
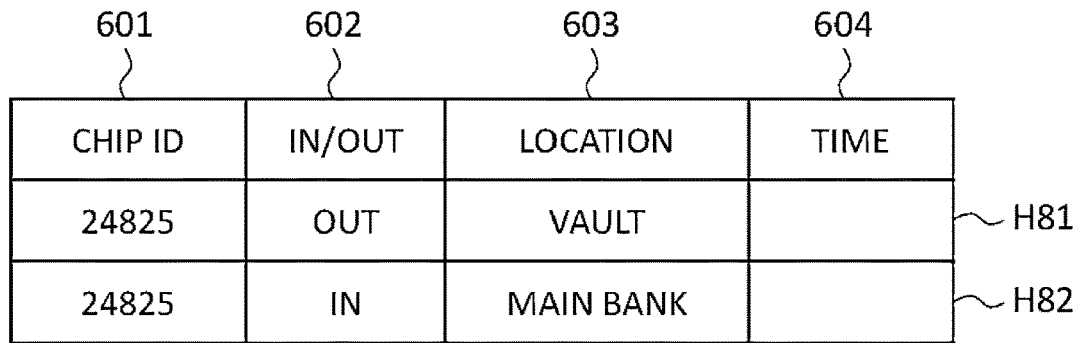
FIG. 8 shows an example of data in the chip management database that is updated by the fourth method of managing the movement of gaming chips in accordance with the embodiment of the present invention.

FIG. 8 shows an example of data in the chip management database that is updated by the fourth method of managing the movement of gaming chips in accordance with the embodiment of the present invention. The chip management database 101 contains information on the movement history of the gaming chips 70, including the chip ID 601, entry/exit information 602, location information 603, and date and time 604 of the gaming chip.

According to the fourth method, as shown in FIG. 8, since the entry/exit information 602 and the location information 603 are recorded, so that based on the history H81 and the history H82, it can be confirmed that the gaming chip 70 has indeed left the vault 11 and been received in the main bank room 12.

In the fifth method, only location information is recorded. In other words, the staff at each location, when the gaming chip 70 is at that location, uses the chip reader at that location to read the chip ID of the gaming chip 70 and reports it to the chip management computer 100. The chip management computer 100 updates the chip management database 101 according to this report. The staff at each location may read the chip ID at the time the gaming chip 70 is moved to that location, or they may read the chip ID when the gaming chip 70 is moved from that location to the other location, or the chip ID may be read at any timing.

Figure 9:
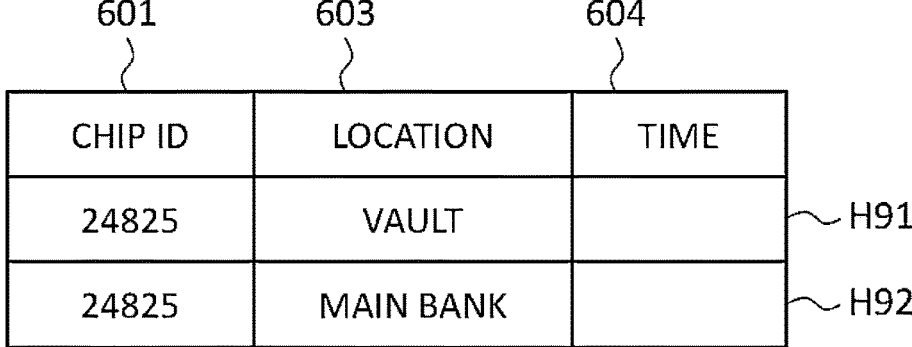
FIG. 9 shows an example of data in the chip management database that is updated by the fifth method of managing the movement of gaming chips in accordance with the embodiment of the present invention.

FIG. 9 shows an example of data in the chip management database that is updated by the fifth method of managing the movement of gaming chips in accordance with the embodiment of the present invention. The chip management database 101 contains information on the movement history of the gaming chips 70, including the chip ID 601, location information 603, and date and time 604.

The fifth method also records the location information 603 as shown in FIG. 9, so that based on the history H91 and the history H92, it can be confirmed that the gaming chip 70 did indeed leave the vault 11 and was received in the main bank room 1.

It may be decided which of the above first to fifth methods is to be used for each combination of source and destination. For example, the fourth or fifth method may be used for the movements of gaming chips 70 in the cage 11, the second method may be used for the movements from the F/C bank room 13 to the game table, where the destination is designated at the source, and the first method may be used for the movements from the game table to the F/C bank room 13, where the source is designated at the destination.

When gaming chips 70 are transferred from the cashier room 14 to the player (the player purchases the gaming chips 70 at the cashier), the cashier computer 141 reads the chip ID of the gaming chip 70 with the cashier chip reader 143 and the player ID from the player's ID card at the cashier card reader 142, and the designation of the player as a destination along with the read chip ID is reported to the chip management computer 100. The chip management computer 100 updates the chip management database 101 according to this report.

Then, when the gaming chips 70 are transferred from the player to the cashier room 14 (the player redeems the gaming chips 70 at the cashier), the cashier computer 141 reads the chip ID of the gaming chip 70 with the cashier chip reader 143, and the cashier card reader 142 reads the player ID from the player's ID card, and the designation of the player as a source along with the read chip ID is reported to the chip management computer 100. The chip management computer 100 updates the chip management database 101 according to this report.

FIG. 10 shows an example of data in the chip management database that is updated by the fourth method of managing the movement of gaming chips in accordance with the embodiment of the present invention. In the example in FIG. 10, player-5 purchases the gaming chips 70 at cashier-2 (histories H101 and H102) and then redeems the gaming chips 70 at cashier-3 (histories H103 and H104). In the case of the first to third method, the entry/exit information 602 may be N/A, and only the information on the source (cashier) and the information of the destination (player) may be recorded.

Also, for example, at a cashier, when the cashier staff receives the gaming chips 70 from a player, they may designate that they will receive them and then use the cashier chip reader 143 to read the chip ID of the gaming chip 70, and when handing the gaming chip 70 to a player, they may designate that the player will receive the gaming chip 70 and then use the cashier chip reader 143 to read the chip ID of the gaming chip 70.

This allows a single chip reader to be used to determine whether the gaming chip 70 whose chip ID has been read by the chip reader is coming into or leaving the location. Also, in the case of chip exchange, the chip reader can be used to clearly distinguish between the gaming chips 70 received from the player and the gaming chips 70 given to the player, and to identify chip IDs of the gaming chips 70.

Players who have purchased gaming chips 70 can play games at the game table. In this case, at the game table, the table card reader 15 equipped with an ID card antenna 512 to read the player's ID card. When the player's ID card is read by the table card reader 152, the player's playing position is designated. This allows the system to recognize which player is corresponding to which betting area. Note that betting area antennas 515a-515e may be one or more antennas that reads the gaming chips 70 placed in one betting area grouping multiple betting areas of multiple player positions without distinguishing each player position.

If a player loses a game at the table, the gaming chips 70 that he/she has bet on are collected. In this case, the chip tray antenna 514 reads the chip ID of the gaming chips 70 that are housed in the chip tray before the collection and also reads the chip ID of the gaming chips 70 that are housed in the chip tray after the collection. By comparing the chip IDs of the chip trays before and after collection, the table computer 151 can determine the chip IDs of the gaming chips 70 newly brought into the chip tray (i.e., collected from the player).

The table computer 151 reports the chip ID read by the chip tray antenna 14 to the chip management computer 100 for the gaming chips 70 collected from players, along with the designation that the chips are being moved to the chip tray of the game table. The chip management computer 100 updates the chip management database 101 according to this report.

By using the betting area antennas 515a-515e to recognize the chip ID of the gaming chips 70 that have been bet and recognizing the game result, the table computer 151 can determine whether or not each gaming chips 70 that have been bet should be collected in the case that it can be determined that the gaming chip 70 should be collected, the chip management database 101 may update the movement history in the chip management database 101 to indicate that the gaming chip 70 in question is to leave the player and move to the game table according to such determination. By such an update and the subsequent update indicating that it was received in the chip tray, it can be confirmed that the gaming chip 70 to be collected has indeed been collected in the chip tray. In other words, if a movement history is recorded with the entry/exit information 602 as "OUT" and the location information 603 as any player as it should have been collected, but no subsequent movement history of receipt in the chip tray is recorded, then it becomes apparent that the gaming chips 70 to be collected have not been collected correctly.

In the above embodiment, by comparing the chip IDs read from the chip trays before and after the collection, the chip IDs newly brought into the chip tray by the collection are determined. However, instead of this, a special chip collection area that temporarily houses the collected chip may be provided in the chip tray, and an antenna may be provided in the chip collection area that is independent of the other chip tray portions, so that the chip ID of the collected gaming chips 70 can be determined.

Alternatively, for the gaming chips 70 to be collected, the dealer antenna can be used to read the RFID tags 71 of the gaming chips 70 on the way from the betting area to the chip tray to identify the chip IDs of the gaming chips 70 being collected.

When a player wins a game, the gaming chip 70 is redeemed. The dealer first places the gaming chips 70, which are paid out to the player from the chip tray, in the dealer area of the game table. In this case, the chip ID of the redeemed gaming chip 70, which is associated with the dealer or casino, and the chip ID of the gaming chip 70 that was being bet on, which is associated with the player, will be read, whereas the chip management computer 100 associates the chip ID of the redeemed gaming chip 70 to the player who was associated with the chip ID of the gaming chip 70 that was being bet on.

The method of identifying the chip ID of the gaming chip 70 to be redeemed and associating it with the player is not limited to the above, for example, the table computer 151 may read the chip IDs of the gaming chips 70 stored in the chip tray before and after redemption, thereby identifying the chip IDs of the gaming chips 70 to be redeemed and associate the identified chip IDs with the player who receives the redemption.

When the gaming chip 70 to be redeemed is placed in a betting area, the betting area antenna 515 in the betting area may read the chip ID of the gaming chip. In this case, together with the chip IDs of the redeemed gaming chips 70, which are associated with the dealer or casino, the chip IDs of the bet gaming chips, which are associated with the player, will also be read, whereas the chip management computer 100 associates the chip ID of the redeemed gaming chip 70 with the player who is associated with the chip ID of the bet gaming chip 70.

In addition, an antenna and reading area may be provided for each player position to read the RFID tag 71 of the gaming chip 70 to be redeemed. Such an antenna and reading area may be located between the betting area of each player position and the dealer. In this case, it is still possible to associate the gaming chips 70 to be redeemed with the player IDs, since it is known which player is in each player position. In this case, the dealer may first place the gaming chips 70 to be redeemed in the reading area of the relevant player position, have them read by the antenna there, and then move the gaming chips 70 to the side of the betting chips in the betting area, or have the relevant player take the gaming chips 70 to be redeemed that the dealer has placed in the reading area.

The table computer 151 reports the combination of the chip ID of the gaming chips 70 to be redeemed and the player ID of the player receiving the redemption to the chip management computer 100. The chip management computer 100 updates the movement history in the chip management database 101 according to this report to reflect that the gaming chips 70 from the game table have been moved to the player.

At the time of redemption, also, the chip IDs of the gaming chips 70 to be redeemed may be identified by reading the RFID tags of the gaming chips 70 removed from the chip tray once by the dealer antenna.

In the examples in FIGS. 6-10 above, as each movement history of each gaming chip 70, not only the information of the location, but also the staff ID of the staff member involved in the movement at that location may be recorded. In addition, in each movement history, status such as "valid," "invalid," "missing," "suspicious," "not redeemable," "not playable," etc. may be recorded as status information of the gaming chips 70. It may also be possible to indicate whether the chip is valid or invalid with a flag. Furthermore, in the examples in FIGS. 6-10 above, each movement history record may also have information on the face value of each gaming chip 70 along with its chip ID.

As described above, by reading the chip ID at each location, it is possible to record the movement history of each gaming chip 70 in the chip management database 101. This allows the chip management computer 100 to perform various functions described below.

In this function, for the movement of the gaming chips 70 between the F/C bank room 13 and the game table, the chip management computer 100 monitors the movement and issues an alert if there is a problem. In other words, the chip management computer 100 starts time counting when it receives a report from the F/C bank computer 131 that a certain gaming chip 70 has left the F/C bank room 13 to a game table as a destination. The chip management computer 100 may issue an alert in the case not receiving a report from the table computer 151 at the destination game table that it has received the gaming chip 70 within a predetermined time (e.g., five minutes). This alert may be sent to the dealer of the relevant gaming table or a pit manager managing the relevant gaming table, etc. At this time, the chip management computer 100 may update the status of the relevant gaming chip 70 to "missing," "not redeemable," "not playable," etc. in the chip management database 101.

The chip management computer 100 may issue an alert if it receives a report from the F/C bank computer 131 that a certain gaming chip 70 has left the F/C bank room 13, designating one of the game tables as the destination, but it receives a report from the table computer 151 of a game table other than the game table designated as the destination. In this case, the chip management computer 100 may update the status of the relevant gaming chip 70 in the chip management database 101 to "wrong destination," "not redeemable," "not playable," etc.

In this function, the chip management computer 100 consults the chip management database 101 and issues an alert when there is an inappropriate movement of the gaming chips 70. The movement of gaming chips 70 is limited to the patterns shown in FIG. 5, and any movement patterns other than these are inappropriate movements. Therefore, each time the chip management computer 100 updates the chip management database 101, the computer 100 determines whether or not the move for the update is appropriate.

For example, if the cage 10 has the configuration shown in FIG. 1, then the gaming chip 70 will never be moved from the vault 11 directly to the cashier room 14, and, for example, the gaming chip 70 that have not been moved from the cashier room 14 to the player will never be collected at the game table. If a history of these movements is discovered, the chip management computer 100 determines that they an improper movement. If gaming chips 70 that should be in the possession of one player are redeemed at the cashier by another player, the possibility of money laundering is suspected. Thus, the chip management computer 100 detects the inappropriate movement and issues an alert.

In this function, the chip management computer 100 refers to the chip management database 101 to extract only the gaming chips 70 held by any player in the latest information in the movement history and calculates the total amount of the extracted gaming chips, thereby calculates the total amount of chips held by all players at that time, i.e., the casino's outstanding debt at that point in time.

The total amount of player chips may be calculated as the total amount of all gaming chips managed in the chip management database 101 minus the total amount of the gaming chips 70 in the cage 10 and the total amount of gaming chips at the game tables.

In this function, the chip management computer 100 refers to the chip management database 101 to extract, for each game table, the gaming chips 70 at that game table at the game table and detects the total number for each face value. If there are gaming chips 70 of insufficient face value, a notice may be issued to the F/C bank computer 131 in the F/C bank room 13 and the table computer 151 at the game table to replenish (fill) the gaming chips 70 of that face value. The notice specifies the number of the gaming chips 70 to be replenished for each face value or the total amount of the gaming chips 70 to be replenished for each face value.

The chip management computer 100 refers to the chip management database 101 to extract, for each game table, the gaming chips 70 in that game table and detects the total number of the gaming chips 70 at the game table. If the total number of the gaming chips is greater than a predetermined number near the maximum number of the gaming chips that can be accommodated in the game table, a notice may be issued to the F/C bank computer 131 in the F/C bank room 13 and the table computer 151 at that game table to collect (credit) the gaming chips 70 from that game table. The notice specifies the number of the gaming chips 70 to be replenished for each face value or the total amount of the gaming chips 70 to be replenished for each face value.

The notice may also be issued in the same manner for the movement of the gaming chips 70 within the cage 10. For example, if the number of the gaming chips 70 is low in a certain window of the cashier room 14, a notice may be issued to the cashier computer 141 and the main bank computer 121 to propose them to replenish the gaming chips 70 in the cashier room 14.

In the above, a notice proposing the movement was issued to both the destination and the source, but alternatively, a notice may be issued to only one of the destination and the source. At the location that receives the notice proposing the movement, the staff may indicate to the computer at that location via the input device whether or not to accept the proposal to move, and the computer at that location may issue an order to move to the other location if either the destination or the source location accepts the proposal.

The above describes a method of movement management by updating the movement history in the chip management database 101 for each gaming chip 70. However, when multiple gaming chips 70 are moved between locations, it is possible to manage whether those multiple gaming chips 70 have been moved without excess or deficiency.

The following is an example of a case where multiple gaming chips 70 are moved from the F/C bank room 13 to a game table (fill). When gaming chips 70 are moved from the F/C bank room 13 to a given game table, F/C bank staff 33 in F/C bank room 13 uses the bank chip reader 133 to read the chip ID of the moving gaming chips 70. The F/C bank computer 131 reports the read chip ID to the chip management computer 100. The chip management computer 100 stores the chip IDs (source chip IDs) of the multiple gaming chips 70 for the fill and, based on the report, refers to the chip management database 101 to obtain the face values of those chip IDs to determine the total amount of the gaming chips 70 for the fill (source total amount). In this way, the chip management computer 100 will know the source chip IDs, the total number (source total number) and the source total amount of gaming chips 70 pertaining to the fill based on the information from the F/C bank computer 131.

When the gaming chips 70 are brought to the game table, the dealer can use table chip reader at the game table to read the chip IDs of the gaming chips 70 brought to the game table, and the table computer 151 reports the multiple chip IDs read to the chip management computer 100. The chip management computer 100 stores those multiple chip IDs (destination chip IDs) and, based on the reports, refers to the chip management database 101 to obtain the face values of those chip IDs to determine the total amount of the gaming chips 70 for the fill (destination total amount). This allows the chip management computer 100, based on the information from the table computer 151, to determine the destination chip ID, the total number of the gaming chips 70 (destination total number) and the destination total amount of the gaming chips 70 pertaining to the fill.

The chip management computer 100 compares the source chip ID and the destination chip ID to determine whether or not they are an exact match. The chip management computer 100 also compares the source total amount and the destination total amount to determine whether they match. Furthermore, the chip management computer 100 compares the destination total number and the destination total number to determine whether they match. If there is a discrepancy in any of the above comparisons, the chip management computer 100 determines that the transfer was not performed correctly and issues an alert.

When the gaming chips 70 are moved from the gaming table to the F/C bank room 13, the dealer reads the chip ID of the moving gaming chips 70 using the table chip reader 153 at the gaming table. The table computer 151 reports the read chip ID to the chip management computer 100. The chip management computer 100 stores the chip IDs (source chip IDs) of multiple gaming chips 70 for credit and, based on the report, refers to the chip management database 101 to obtain the face values of those chip IDs to determine the total amount of the gaming chips for credit (credit total amount). In this way, the chip management computer 100 will know the source chip IDs, the total number of gaming chips 70 pertaining to the credits (source total number) and the source total amount of the gaming chips pertaining to credit (source total amount), based on the information from the table computer 151.

When the gaming chips 70 are brought to the F/C bank room 13, the F/C bank staff 33 reads the chip IDs of the gaming chips 70 brought by the F/C bank chip reader 133, and the F/C bank computer 131 reports the multiple chip IDs read to the chip management computer 100. The chip management computer 100 stores those multiple chip IDs (destination chip IDs) and, based on the report, refers to the chip management database 101 to obtain the face value of those chip IDs to determine the total amount of the gaming chips 70 for credit (destination total amount). In this way, the chip management computer 100 will know the destination chip IDs, the total number (destination total number) and the destination total amount of gaming chips 70 pertaining to the credits based on the information from the F/C bank computer 131.

The chip management computer 100 compares the source chip IDs with the destination chip IDs to determine if they are an exact match. The chip management computer 100 also compares the source total amount and the destination total amount to determine whether they match. Furthermore, the chip management computer 100 compares the source total number and the destination total number to determine whether they match. If there is a discrepancy in any of the above comparisons, the chip management computer 100 determines that the movement was not performed correctly and issues an alert.

In the above, the chip ID, the total amount, and the total number are all compared, but only one of them may be compared to determine whether the movement was made accurately. The total amount and total number may be calculated and compared for each face value of the gaming chips 70. For example, the source total amount and the destination total amount may be calculated as "$600 for $10 chips, $400 for $100 chips."

If the chip management computer 100 has notified the destination or the source to request movement, it may be determined whether the movement was made accurately by performing at least one of comparison between the notice and the source total amount, comparison between the notice and the destination total amount, comparison between the notice and the source total number, and comparison between the notice and the destination total number.

When gaming chips 70 are carried from the F/C bank room 13 to a game table to replenish the game table (fill), the chip IDs of the gaming chips 70 being carried toward the game table are read by the F/C bank chip reader 133, and those chip IDs are reported from the F/C bank computer 131 to the chip management computer 100. The chip management computer 100 calculates the total amount of the gaming chips 70 reported (total fill amount) by referring to the chip management database 101.

By referring to the chip management database 101, the chip management computer 100 extracts the gaming chips 70 at the relevant game table before the fill and calculates the total amount of the chips (existing total amount). Then, the chip management computer 100 calculates the theoretical total amount of gaming chips 70 at the relevant game table after the fill (theoretical total amount after fill) by adding the total fill amount to the calculated existing total amount.

At the game table, when the gaming chips 70 are brought in from the F/C bank room 13, the table chip reader 153 at the game table reads the chip IDs of the gaming chips 70 brought in and reports it to the chip management computer 100 by the table computer 151. The chip management computer 100 obtain the face values for the reported chip IDs by referring to the chip management database 101 to calculate the actual total amount of the gaming chips 70 in the chip tray (actual total amount after fill).

If the game table has a cabinet or a double chip tray, i.e., if the game table has a place to store the gaming chips other than the chip tray, the table computer 151 calculates the total amount of gaming chips 70 (but not the gaming chips placed in the betting area) for the entire game table, including the chip tray and such storage places as the actual total amount after fill.

The chip management computer 100 compares the theoretical total amount after fill with the actual total amount after fill and issues an alert if the two do not match. This configuration allows the user to check whether the gaming chips 70 have been correctly increased at the game table by the fill.

In addition, in the F/C bank room 13, the chip IDs of all gaming chips 70 that leave the F/C bank room 13 are known, and in the game table, the chip IDs of all gaming chips 70 that have moved from the F/C bank room 13 are detected, so that if the theoretical total amount after fill and the actual total amount after fill do not match, the chip IDs of the gaming chips 70 that caused the discrepancy can be ascertained. The chip management computer 100 changes the status of the gaming chip 70 that caused the discrepancy to "invalid," "not redeemable," "not playable," etc.

In the above, the theoretical total amount after fill is compared with the actual total amount after fill, but in addition to or instead of the amount (total amount) of the gaming chips 70, the number (total number) of the gaming chips 70 may be used to determine whether the fill has been completed without excess or deficiency by comparing the theoretical total number of the gaming chips 70 after fill in the game table (theoretical total number after fill) with the actual total number of the gaming chips 70 after fill in that game table (actual total number after fill).

When gaming chips 70 are carried from the gaming table to the F/C bank room 13 when the gaming chips 70 are excess at the gaming table (credit), the chip IDs of the gaming chips 70 being carried toward the F/C bank room 13 are read at the table chip reader 153. Those chip IDs are reported from the table computer 151 to the chip management computer 100. The chip management computer 100 calculates the total amount of gaming chips 70 reported (total credit amount) by referring to the chip management database 101.

By referring to the chip management database 101, the chip management computer 100 extracts the gaming chips 70 at the relevant game table before the credit and calculates the total amount (existing total amount). Then, the chip management computer 100 calculates the theoretical total amount of gaming chips 70 at the relevant game table after the credit (theoretical total amount after credit) by subtracting the total credit amount from the calculated existing total amount.

At the game table, as the gaming chips 70 are carried toward the F/C bank room 13, the chip tray chip reader 154 at that game table reads the chip IDs of the gaming chips 70 stored at the game table, and the table computer 151 reports them to the chip management computer 100. The chip management computer 100 obtains the face values by referring to the chip management database 101 for the reported chip IDs to calculate the actual total amount of the gaming chips 70 in the chip tray (actual total amount after credit).

If the game table has a cabinet or a double chip tray, i.e., if the game table has a place to store the gaming chips 70 other than the chip tray, the table computer 151 calculates the total amount of the gaming chips 70 for the entire game table including the chip tray and such storage places (but not the gaming chips of the players placed in the betting area) as the actual total amount after credit.

The chip management computer 100 compares the theoretical total amount after credit with the actual total amount after credit and issues an alert if the two do not match. This configuration allows the user to check whether the gaming chips 70 are correctly reduced at the game table by credit.

In addition, at the game table, the chip IDs of all the gaming chips 70 that are moved from the game table to the F/C bank room 13 are known, and in the F/C bank room 13, the chip IDs of all the gaming chips 70 that have been moved from the game table are detected, so that if the theoretical total amount after credit and does not match the actual total amount after credit, the chip IDs of the gaming chips 70 that caused the discrepancy can be ascertained. The chip management computer 100 changes the status of the gaming chip 70 that caused the discrepancy to "invalid," "not redeemable," "not playable," etc.

Although the above compares the theoretical total amount after credit with the actual total amount after credit, it can be determined that whether the credits have been completed without excess or deficiency by using the number (total number) of the gaming chips in addition to or instead of the amount (total amount) of the gaming chips 70, and comparing the theoretical total number of the gaming chips 70 after credit in the game table (theoretical total number after credit) with the actual total number of the gaming chips 70 after credit in that game table (actual total number after credit).

In the above, the total credit amount was ascertained by reading the gaming chips 70 carried to the F/C bank room 13 with the table chip reader 153, and then subtracting the total credit amount from the existing total amount (the total amount of the gaming chips 70 on the game table before credit execution) to obtain the theoretical total amount after credit, however, instead of this, the following may be used. If the chip management computer 100 issues a notice to propose credit to the game table, and the game table credits in response to this notice, the total amount or total number of the gaming chips 70 for credit specified in the notice (both of which may be specified for each face value) as the total credit amount may be subtracted from the existing total amount of credits to calculate the theoretical total amount after credit. Once the chip management computer 100 calculates the theoretical total credit amount, it compares the theoretical total amount after credit with the actual total amount after credit (the actual total amount of the gaming chips 70 after credits at the game table) in the same manner as above, to determine whether the specified amount or number of the gaming chips 70 has left the gaming table for credit or not.

The cage 10 has locked doors to prevent arbitrary entry of people, and staff can enter and exit the cage 10 by meeting security requirements. The same entry and exit security is also implemented between each room in the cage 10. Staff working in the cage 10 are required to authenticate when entering or leaving the cage 10 or the room in which they work. The chip management computer 100, when authenticating staff members to leave, verifies that there has been no improper movement of the gaming chips 70 from the time the staff member entered the room to the time the staff member left the room. The chip management computer 100, in conjunction with the locking system, will not allow the staff member to leave if there has been an inappropriate movement of the gaming chip 70.

The same process is also used at the game table. When a dealer leaves the game table, the dealer designates the end of his/her work and then the dealer has his/her own ID card read by the table card reader 152 to read it. At this time, the chip management computer 100 verifies that there has been no improper movement of the gaming chips 70 from the time the dealer arrives at the game table to that time. If there is any inappropriate movement, an alert is issued. In addition, when a dealer is changed, the chip management computer 100 verifies that the gaming chips 70 that should be at the game table are present after the dealer leaves the game table and before the next dealer takes over at the game table, i.e., the dealer leaving the table does not take the gaming chips 70 from the game table, and if there is a problem, an alert is issued.

At the game table, the gaming chips 70 may be stored in a place other than the chip tray. For example, the chip tray may be double, with the gaming chips 70 for replenishment stored in the lower chip tray, or the gaming chips 70 for replenishment may be stored in a cabinet of the game table. In these cases, the gaming table should also be equipped with an antenna to read the RFID tags 71 of the gaming chips 70 so stored, and the table computer 151 should always be able to read the RFID tags 71 of all gaming chips 70 on the gaming table.

In this function, the chip management computer 100 verifies the history of purchases and redemptions of the gaming chip for each player and issues an alert in the event of suspicious activity. For example, if there are purchases of the gaming chips 70 above a predetermined amount and redemption of the gaming chips 70 above a predetermined amount within a predetermined time period, an alert is issued for such behavior as suspicious behavior. Also, if the gaming chips 70 have been purchased and are about to be redeemed without being used at the game table, and the amount of the gaming chips 70 is over the predetermined amount, an alert will be issued for such suspicious activity. Also, if a player purchases the gaming chips 70 in excess of the predetermined amount within a predetermined time period, an alert is issued for such behavior as suspicious behavior.

The gaming chip 70 may be activated (validated) in the cage 10. This ensures that if a gaming chip 70 is stolen between the time it is manufactured and transported to the cage 10, such gaming chips 70 cannot be used because it has not been activated (validated), thus ensuring security. To this end, the chip management database 101 stores a table of the chip IDs of activated gaming chips 70, and each time the chip ID of a the gaming chip 70 is read by the chip reader at the cashier or the game table, the chip management computer 100 verifies whether or not the chip ID is activated (validated) by referring to the table.

Also, when the gaming chip 70 is disposed of, the gaming chip 70 is taken out of the cage 10 after the deactivation (invalidation) process is performed in the cage 10. This ensures that even if gaming chips 70 taken outside the cage 10 for disposal are stolen, such gaming chips 70 cannot be used at the cashier or the game table, thus ensuring security.

Even unregistered players can purchase the gaming chips 70 and play games at the game tables using the gaming chips 70. For unregistered players, a common anonymous player ID is used. This allows the gaming chip 70 can be traced without interruption even if the gaming chip 70 is moved to a unregistered player while the gaming chip 70 being transferred from one location to another from the time it leaves the cage 10 to the time it returns to the cage 10.

A display device may be provided in the cashier's window that shows the total amount of the gaming chips 70 and the results of the validity check. The cashier staff may place the gaming chips 70 70 to be given to or received from the player at the cashier chip reader 143. The cashier chip reader 143 reads the face value and status stored on the RFID tag 71 of the gaming chip(s) 70 (usually multiple). The cashier computer 141 displays the total face value read by the cashier chip reader 143 on a display device. In addition to the total amount, the number of the gaming chip 70 for each face value may be displayed.

The cashier computer 141 displays an error message on the display device if any of the RFID tags 71 read are from a gaming chip 70 whose status is not valid, and displays a pass message on the display device or displays nothing if the status of all gaming chips 70 is valid. In addition to the status, the display device may also indicate whether there has been any previous history of improper movement. This allows the cashier staff and the player to agree that the gaming chips to be given to or received from the player are valid and that the total amount of the gaming chips 70 is agreed upon between the cashier staff and the player.

In the above embodiment, when the RFID tag 71 of the gaming chip 70 is read by the chip reader at each location, the chip management computer 100 check the validity of the chip ID by verifying that the chip ID read is the chip ID of a valid chip, and if there is a problem, an alert may be issued. For this purpose, a table of valid chip IDs is recorded in the chip management database 101, and the chip management computer 100 refers to this table to verify that the chip ID read at each location is valid. The chip ID may be encrypted.

In the above embodiment, the chip management computer 100, in addition to or instead of issuing an alert, may also flag a record of the corresponding player, the gaming chip 70, or the movement history to indicate an abnormality and record the time of the abnormality.

The configuration of the rooms of the cage 10 is not limited to those described above, and the number of rooms and the arrangement of the rooms may be arbitrary. The game table may be a table for playing baccarat, blackjack or other card games, and there may be, in addition to the game table, locations for playing other games such as roulette included.

Each of the above computers has a processor and a memory, and the processor performs the above operations by executing a computer program stored in the memory. The program may be provided to the computer by means of a non-transient storage medium or may be provided to the computer by way of downloading. The communication between computers may be wired or wireless. In the above embodiment, identified staff members and players is identified at each location by each card reader reading ID cards, however, instead of ID cards, staff and players may be identified by biometrics such as fingerprints, facial images, iris, voice prints, etc.

In the above embodiment, each room and game table in the cage 10 is used as an example of a location to manage the movements of the gaming chips 70 between locations. However, examples of locations are not limited to this, and include, for example, a chip tray at a game table to which a dealer stores collected chips and from which redemption chips are paid out, a cabinet at a game table where the gaming chips are stored, a top tier and a bottom tier when the chip tray consists of two tiers can each be a location of the embodiment described above, and the same management as above can be performed for movements of the gaming chips 70 between the respective locations.

For example, an alert may be issued when the chip IDs, total amount, and/or total number of the gaming chips 70 removed from the cabinet of a certain game table is ascertained and the chip IDs, total amount, and/or total number have not been moved to the chip tray of the same game table within a predetermined time. Also, for example, in a double chip tray, it may be checked that the gaming chips 70 removed from the lower chip tray have been moved to the upper chip tray, or the gaming chips removed from the upper chip tray have been moved to the lower chip tray.

In addition, when performing fills, the gaming chips 70 brought from the F/C bank room 13 to the game table are read by the dealer antenna 513, the betting area antenna 515, or the tray antenna 514. The chip tray is equipped with buttons to recognize the start and end of the fill operation, and the gaming chips 70 increased by the fill are recognized as the filled gaming chips 70 by comparing the gaming chips 70 in the chip tray before the fill with the gaming chips 70 in the chip tray after the fill.

When performing credit, the gaming chips 70 to be carried to the F/C bank room 13, are read by the dealer antenna 513, the betting area antenna 515, or the chip tray antenna 514. The chip tray is equipped with buttons to recognize the start and end of the credit operation, and the gaming chips 70 reduced by the credit are recognized as the gaming chips 70 to be credited by comparing the gaming chips 70 in the chip tray before the credit with the gaming chips 70 in the chip tray after the credit.

The chip management computer 100 may be capable of outputting the chip inventory (chip IDs) for each location (cage, chip tray, etc.). The chip management computer 100 may be capable of specifying a past point in time and outputting the inventory at that point in time.

It may also be possible to alert the cashier when a suspicious gaming chip (flagged gaming chip) is about to be redeemed at the cashier.

The chip management database 101 may be capable of storing the redemption history of each player. The chip management computer 100 may also be capable of outputting the chip ID that should be owned by players.

The RFID tag 71 may have information such as chip set, casino information, location information, and redemption availability written to it. Alternatively, such information may be associated with the chip ID and stored in the chip management database 101. When an RFID tag 71 is read at a location, the chip management computer 100 or the computer at each location may inspect whether it is the gaming chip 70 that should be at that location based on those information.

The available gaming chip 70 groups (chip sets) and gaming chip types may be set for each area. For example, the table computer 151 or the chip management computer 100 may be able to, when an RFID tag 71 is read at a game table, check whether the gaming chip belongs a chip set that should be used at the game table.

The gaming chips 70 that have been in use for a certain number of years may be flagged in association with a chip ID. The gaming chips 70 that have been in use for a certain number of years may be located and collected. If a player has a gaming chip 70 that has been in use for a certain number of years, a signal is output when the chip ID is detected at the cashier or the game table.

When a player in possession of a potentially stolen gaming chip 70 arrives at the game table, the table computer 151 or chip management computer 100 may issue a warning to the staff (supervisor). The cashier computer 141 or the chip management computer 100 may, for anti-money laundering purposes, detect the gaming chips that are purchased and then redeemed without being played.

At the cashier, a player's photo will be associated with the chip ID when a redemption or chip purchase is made for an amount above the threshold. Anonymous players (players without a member card) are also given a unique ID to trace their chips. For anonymous players, the player's face may be photographed at the time of chip purchase, the player ID may be associated with the face image and registered in the chip management database 101, and at each subsequent location (table, cashier, etc.), the player ID may be identified through facial recognition. The chip management computer 100 may disable all chip statuses associated with blacklisted players.

When a player without a member card bets the gaming chips 70 at a game table, the chip management computer 100 records the play in the chip management database 101, associating the play with the unique ID issued on the spot and/or the player ID associated with the gaming chips 70. At this time, a facial image or ID based on facial recognition may be associated with the play. If the member card is recognized later, the play record may be retroactively associated with the member card ID.

The invention claimed is:

1. A game table system for facilitating crediting of gaming chips with RFID tags, the game table system comprising:
   a dealer antenna corresponding to a dealer area on a table surface of the game table and configured to read the RFID tags of the gaming chips placed in the dealer area;
   a storage area antenna configured to read the RFID tags of the gaming chips placed in a storage area; and
   a management device configured to:
      receive a notification of a prompt to credit the gaming chip;
      obtain pre-credit inventory data of the RFID tags of the gaming chips placed in the storage area read by the storage area antenna prior to the credit being performed;
      obtain a first value of the gaming chip read by the dealer antenna after the gaming chip pertaining to the credit has been moved from the storage area to the dealer area,
      obtain a post-credit inventory data of the RFID tags of the gaming chips placed in the storage area read by the storage area antenna after the gaming chip pertaining to the credit has been removed from the storage area; and
      verify that a second value of the gaming chips removed from the storage area calculated based on the pre-credit inventory data and the post-credit inventory data is equal to the first value of the gaming chips obtained at the dealer area.

2. The game table system according to claim 1, wherein the first value and the second value include at least one or more of the following: chip IDs of the gaming chips; a total chip value of the gaming chips; and a total number of the gaming chips.

3. The game table system according to claim 1, wherein the management device is configured to issue an alert when there is a discrepancy between the second value and the first value.

4. The game table system according to claim 1, wherein the management device is capable of identifying a chip ID of the gaming chip that is a cause of the discrepancy when there is the discrepancy between the second value and the first value.

5. The game table system according to claim 1, wherein the first value and the second value include at least chip IDs of the gaming chips, and the management device is configured to update a status of the gaming chip that is a cause of the discrepancy when there is the discrepancy between the second value and the first value.

* * * * *